July 3, 1928.
J. POLAND
1,675,991
BATTERY CONNECTER
Filed Feb. 11, 1922
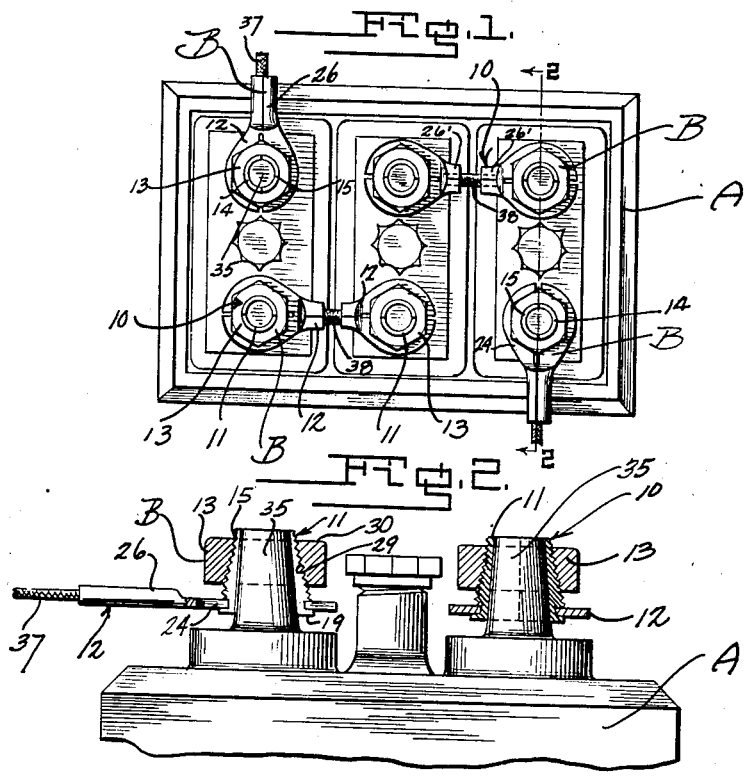
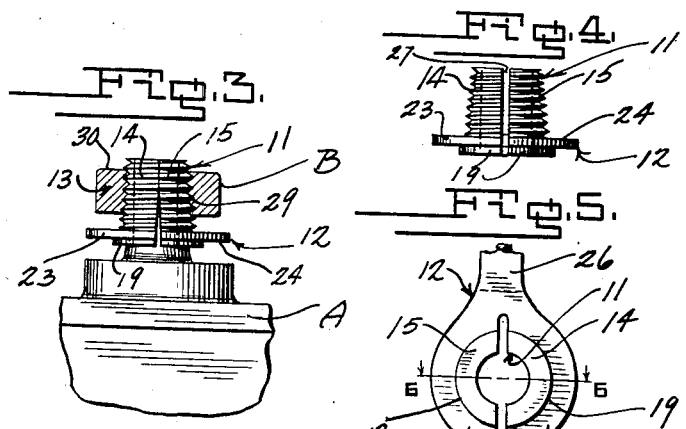
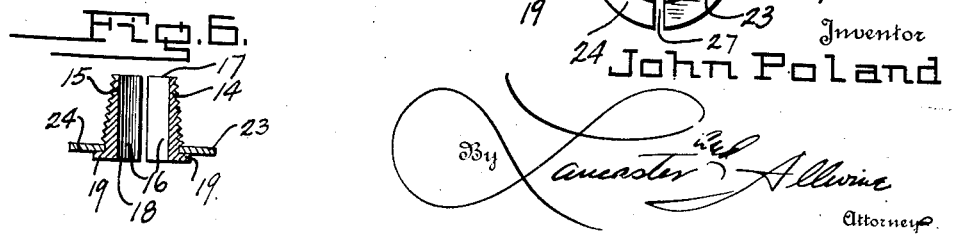
Inventor
John Poland Patented July 3, 1928.

1,675,991

UNITED STATES PATENT OFFICE.

JOHN POLAND, OF CASCADE, MONTANA, ASSIGNOR OF ONE-HALF TO JOHN GORMAN, OF BELT, MONTANA.

BATTERY CONNECTER.

Application filed February 11, 1922. Serial No. 535,821.

This invention relates to improvements in connecters for securing electric wires and the like to terminal posts and other contacts.

The primary object of the invention is the provision of an improved connecter particularly adapted for use in connection with storage batteries to successfully maintain energy conducting wires in secure relation to terminal and cell posts thereof.

A further object of the invention is the provision of a novel and durable connecter for storage batteries, capable of convenient and easy attachment to the posts of a storage battery.

A further object of the invention is the provision of a novel connecting strap for storage batteries, including improved means for secure adjustment of the same upon the terminal or cell posts of the storage battery.

Other objects and advantages will be apparent during the course of the following detailed description.

In the accompanying drawing, forming a part of this specification, and wherein similar reference characters designate corresponding parts throughout the several views:

Figure 1 is a plan view of a storage battery having the improved connecters used thereon.

Figure 2 is a cross sectional view taken through the connecters as attached to the storage battery and showing the manner in which the improved connecters are adjusted upon the binding posts of the storage battery.

Figure 3 is a cross sectional view of a part of the improved connecter showing the manner in which the same is secured to a battery post.

Figure 4 is a side elevation of a portion of the improved connecter.

Figure 5 is a bottom plan view of the detail illustrated in Figure 4.

Figure 6 is a cross sectional view taken on the line 6—6 of Figure 5.

In the drawing, wherein for the purpose of illustration is shown the preferred embodiment of the improved connecter, the letter A designates a storage battery, having the improved connecter B mounted thereon. When individually used, the connecter B may be utilized upon the storage battery A as a terminal connecting strap. A pair of the connecters B may be suitably mounted together, however, to provide a cell connecting strap 10.

Each connecter B includes a sleeve member 11, sleeve supporting member 12, and adjusting member 13.

The sleeve member 11 preferably comprises a pair of similarly shaped concavo convex segments 14 and 15, the concaved surfaces 16 of which, are arcuated in smooth manner upon an even radius throughout. Each of the sleeve segments 14 and 15 increase in thickness from the upper edge 17 to the bottom surface 18, and upon which bottom surface 18 is formed an outwardly extending seating flange 19. The sleeve segments 14 and 15 are tapered upon their convex surfaces, which are preferably screw threaded, from the top edges 17 downwardly to a point adjacent the outwardly extending flanges 19.

The flat member 12 for supporting the clamping sleeve 11, preferably comprises a pair of outwardly extending arms 23 and 24, arcuated in split ring formation to receive the sleeves 14 and 15 respectively, upon the upper surface of the outwardly extending flanges 19, and to which flanges, said arms 23 and 24 are rigidly secured, as by soldering, welding, or the like. The member 12 includes a radial extension 26, from which the arms 23 and 24 extend, so that said arms may support the segments 14 and 15 in sleeve-like arrangement in spaced yieldable relation, and as can readily be seen from Figures 4 and 5 of the drawings, wherein the space 27 indicates the distance which the supporting member 12 normally maintains the segments 14 and 15 apart. In this position, the concaved surfaces of the segments 14 and 15 face each other to provide a uniform bore of the sleeve like arrangement. Likewise, the sleeves 14 and 15 are in such relative positions, by means of the supporting member 12, as to have the outer screw threaded convex surfaces thereof arranged in cooperating manner for receiving the adjusting member 13. The supporting member 12 is preferably connected at the ends of the sleeve 13 as to be disposed in a plane substantially at right angles to the axis of the sleeve.

The nut 13 may be of any approved shape and material, although as shown the same is provided with an internal screw threaded opening 29, which opening tapers as to diameter, in increasing manner from the upper or top surface 30 of the member 13, and as can readily be seen from Figures 2 and 3 of the drawings.

The improved connecter is adapted for use upon battery posts of either the tapering or straight side type. As used upon a tapered battery post 35, the improved connecter is so disposed thereon as to have the uniform bore of the sleeve segments engaging the same circumferentially. Upon application of the adjusting nut 13, it can readily be seen that the sleeve segments 14 and 15 will be relatively moved by reason of their yieldable mounting upon the support 12, so that the concaved surfaces defining the sleeve bore will conform to the external surface taper of the posts 35, as is readily discernible from Figures 2 and 3 of the drawing. The sleeve sections 14 and 15 will assume a position substantially similar to that shown in Figure 3, where the improved connecter B is securely mounted upon the battery post 35. When desiring to use the connecter B upon the straight or uniform diameter battery post, it can be readily seen, that adjustment of the nut 13 upon the sleeve sections 14 and 15 will tend to relatively move said sleeve sections for gripping the posts in circumferential manner, which is primarily due to the manner in which the internal screw threaded tapered opening 29 of the nut 13 cooperates upon the screw threads of the sleeve sections 14 and 15.

When the improved connecter is to be used as a terminal connecting strap, a relatively long extension 26 may be provided for gripping a lead or conducting wire 37. In forming the cell connecting straps 10, a pair of the connecters B are secured together by a short piece of conducting wire 38, or the like, secured by the supporting member portions 26' which, in the case of the cell connecting strap are relatively short, in comparison to the shank or radial extension 26 as used upon the terminal connecter, and as can readily be seen from Figure 1 of the drawing.

From the foregoing, it can be seen that a battery connecter has been provided, which is susceptible of attachment to the posts of standard batteries. By reason of the durable construction of the connecter strap, the same is practically non-breakable, and in contra-distinction in this respect to many types of connecters now on the market. Since the sleeve structures are yieldably supported and maintained in snug relation about their battery posts, by their nut structures, no burning of the battery posts, or mutilation thereof is necessary, in order to move a particular connecter of the novel type herein described.

Various changes in the shape, size and formation of parts of the improved battery connecter may be made to the forms herein shown and described, without departing from the spirit of the invention or the scope of the claim.

I claim:

In a battery connecter the combination of a pair of complementary concavo-convex sleeve segments each being about 180° externally screw threaded from the top edge thereof and each having a segmental laterally extending flange at the lower edge thereof, said sleeve segments each gradually increasing in thickness from the top edge thereof adjacent the respective flange thereof, and a supporting member including a plurality of yieldable arms in split ring formation secured to the flanges of said sleeve segments to support the sleeve segments in a complementary sleeve providing relation with spaces at diametrically opposed facing edges thereof aligning diametrically with the split of the split ring, said supporting member having a wire receiving connecting portion thereon.

JOHN POLAND.